United States Patent
Takayanagi et al.

[11] Patent Number: 5,839,258
[45] Date of Patent: Nov. 24, 1998

[54] STORING METHOD FOR ADSORBENT PARTICLES

[75] Inventors: Hiroaki Takayanagi; Naoko Takasaki; Takashi Mikawa, all of Kanagawa, Japan

[73] Assignee: Mitsubishi Chemical Corporation, Tokyo, Japan

[21] Appl. No.: 756,578

[22] Filed: Nov. 27, 1996

[30] Foreign Application Priority Data

Nov. 28, 1995 [JP] Japan ................................. 7-309213

[51] Int. Cl.$^6$ ................................................. B65B 55/02
[52] U.S. Cl. ............................ 53/425; 53/428; 206/524.4
[58] Field of Search .......................... 206/204, 524.4; 53/167, 425, 428, 440; 422/21, 22, 23, 25

[56] References Cited

U.S. PATENT DOCUMENTS

| | | | |
|---|---|---|---|
| 2,904,392 | 9/1959 | Pomerantz et al. | 422/23 |
| 4,896,768 | 1/1990 | Anderson | 422/22 X |
| 5,061,443 | 10/1991 | Iijima et al. | 422/21 |
| 5,132,504 | 7/1992 | Iijima et al. | 422/21 X |
| 5,254,378 | 10/1993 | Krueger et al. | 206/524.4 X |
| 5,279,788 | 1/1994 | Kudo et al. | 422/21 |
| 5,577,368 | 11/1996 | Hamilton et al. | 53/425 X |
| 5,609,819 | 3/1997 | Shimizu et al. | 53/425 X |

FOREIGN PATENT DOCUMENTS

| | | | |
|---|---|---|---|
| 63-26011 | 5/1988 | Japan | 53/425 |
| 9414657 | 7/1994 | WIPO | 53/425 |

*Primary Examiner*—Daniel B. Moon
*Attorney, Agent, or Firm*—Oblon, Spivak, McClelland, Maier & Neustadt, P.C.

[57] ABSTRACT

A method for storing adsorbent particles of synthetic resin porous particles for a long period of time without causing decrease in the adsorbing performance and without attaching fungi, which method can be effected by irradiation of the porous particles hermetically sealed in a packing material such as a bag with radioactive rays at a dose of 5 to 20 kGy and storage of the resulting adsorbent particles in the hermetically sealed condition.

7 Claims, No Drawings

STORING METHOD FOR ADSORBENT PARTICLES

FIELD OF THE INVENTION

The present invention relates to a method for storing adsorbent particles which, preferably, comprises porous particles of a synthetic resin.

BACKGROUND OF THE INVENTION

Porous particles of synthetic resin such as styrene-divinylbenzene copolymer or methyl methacrylate-ethylene glycol dimethacrylate copolymer have been employed effectively for the adsorption of molecules dissolved in a liquid (e.g., pharmaceuticals such as antibiotics and protein factors) and of gas molecules, making use of their large specific surface area. They have been widely used as adsorbent particles for the removal of unnecessary harmful substances or recovery of useful substances from gas or liquid, for concentration and separation, and the like (see U.S. Pat. No. 3,649,456, No. 3,716,482, No. 3,458,976, No. 3,794,584 and No. 4,199,449 all incorporated herein by reference). However, during transportation, storage or packing, such porous particles are liable to adsorb microorganisms such as spores on their surfaces owing to their adsorptivity and, moreover, they tend to accelerate the proliferation of these microorganisms because of their large surface area. Once microorganisms such as spores start proliferation on the outside surface and/or inside surface region of the porous particles, the surfaces or pores of the porous particles are contaminated and blocked by the microorganism cells, which markedly lowers the adsorbent function of the particles, thereby making them substantially unsuitable for use.

The microorganisms which appear in the adsorbent particles decompose and modify or leave an organic substance concentrated on the surfaces of the adsorbent particles, or contaminate a useful substance (e.g., antibiotics and protein factors) which had been adsorbed by the adsorbent, e.g., with metabolites produced by the microorganisms. Thus, there have been serious problems in the use of adsorbent particles.

The contamination of adsorbent particles by fungi or spores occurs owing to the proliferation of the microorganism bodies such as fungus cells and spores attached to the particles. For storing adsorbent particles for a long period of time, treatment with a chemical has so far been carried out; for example, the adsorbent particles are stored in a high concentration aqueous solution of sodium chloride for the inhibition of the proliferation of microorganisms, or adsorbent particles are washed with an aqueous solution of sodium hydroxide or sodium hypochlorite to kill the microorganism bodies. However, these methods which apply a chemical to the adsorbent particles cannot completely remove the microorganisms attached to the particles. In addition, when the chemical is removed by cleaning after such antibacterial treatment of the adsorbent particles, it is difficult to prevent the re-contamination from air or water at the time of transportation or packing.

Furthermore, treatment with a chemical often causes corrosion and decomposition of the synthetic resin which is a base material for the adsorbent particles, or changes their porosity, which leads to substantial loss of the adsorbing function of the particles.

OBJECTS OF THE INVENTION

One object of the present invention is to provide a method for storing adsorbent particles comprising synthetic-resin porous particles without contamination and for a long period of time. That is, one object of the present invention is to provide a storing method which makes it possible to substantially kill microorganisms such as fungi remaining in the porous particles and, moreover, to prevent contamination thereof by the microorganisms such as fungi for a long period of time.

SUMMARY OF THE INVENTION

The present inventors have discovered that irradiation of adsorbent particles with radioactive rays in a hermetically sealed condition (e.g., in a packing material) enables antimicrobial treatment of the adsorbent particles against fungi or the like without impairing their porous structure and therefore the adsorbent particles can be stored for a long period of time, resulting in the completion of the present invention.

The present invention thus provides a method for storing adsorbent particles, which comprises hermetically sealing the adsorbent particles (preferably comprising synthetic resin porous particles), irradiating radioactive rays on the adsorbent particles in a hermetically sealed condition, and storing them in a hermetically sealed condition.

The development of fungi can be prevented since the adsorbent particles are irradiated with radioactive rays in a hermetically sealed condition and they are stored while maintaining the hermetically sealed condition. During storage, the adsorbent particles are sealed hermetically so that the contamination from outside can be prevented. In addition, with the invention method the adsorption characteristics and strength of the particles are maintained since chemical reactions and exothermic treatment caused by the irradiated rays are avoided.

DETAILED DESCRIPTION OF THE INVENTION

The present invention will hereinafter be described in further detail.

As the base material resin for porous particles, crosslinked synthetic resin particles suitable for use as an adsorbent can be used. Examples of such resin particles include particles of crosslinked polystyrene, crosslinked polymethacrylate, and a phenol-formalin condensate, such as a styrene-divinylbenzene copolymer and brominated products thereof, an ethylene glycol dimethacrylate polymer, a methyl methacrylate-ethylene glycol dimethacrylate copolymer, a stearyl methacrylate-trimethylolpropane trimethacrylate copolymer, and an acrylonitrile-divinylbenzene copolymer. Of these, a styrene-divinylbenzene copolymer is preferable.

With respect to porosity, the porous adsorbent particles according to the present invention preferably has a specific surface area of 10 to 1,500 $m^2/g$, preferably 300 to 1,200 $m^2/g$ and has a pore volume of 0.1 to 3 ml/g, preferably 0.5 to 2 ml/g. The particle size of the porous particles is preferably 5 to 1,000 $\mu$m, and more preferably 50 to 600 $\mu$m.

Adsorbent particles comprising the porous particles of the above-described synthetic resins are available under the following product names: examples of the styrene-divinylbenzene copolymer-based adsorbent particles include "DIAION HP20", "DIAION HP21" and "DIAION HP20SS" (products of Mitsubishi Chemical Corporation) and "Amberlite XAD4" and "Amberlite XAD16" (products of Rohm & Haas Co.). Examples of the polymethacrylate-based adsorbent particles include "DIAION HP2MG" (a product of Mitsubishi Chemical Corporation) and "Amberlite XAD7" (a product of Rohm & Haas Co.).

As the radioactive rays for irradiation, γ rays using cobalt-60 as a radiation source are practical and are therefore preferred. With respect to the irradiation dose of radioactive rays, an irradiation dose rate can suitably be adjusted continuously by controlling the amount of the radiation source, distance from the radiation source or irradiation time. The irradiation dose is preferably 2 to 40 kGy (absorbed dose: gray), more preferably 5 to 20 kGy. The irradiation dose outside the above range is not preferred, because at such a dose, porous particles are not imparted with long-term stability sufficiently, the irradiation dose of γ rays is excessive, or a change in properties occurs.

In order to sustain the stable storing effect for a long period of time by irradiation with radioactive rays, the porous particles are hermetically sealed preferably in a packing material, prior to irradiation. It is also possible to hermetically seal the adsorbent particles after purging the inside of a bag or container with an inert substance such as nitrogen gas or ion-exchanged water. The packing material is required to have a function to prevent microorganism bodies (e.g., spores) from entering directly from outside and attaching to adsorbent particles. Specific examples of the packing material include resin moldings (e.g., film, bag, and container) of a resin such as polyolefin (e.g. polyethylene or polypropylene) or polyethylene terephthalate; and packing materials such as glass bottle, can and barrel. For irradiation with radioactive rays, the conventional apparatus can be used as is. The dried porous particles or porous particles wetted with water or the like are hermetically sealed in a packing material, transferred to the apparatus for irradiation with radioactive rays, subjected to the irradiation under the above-described conditions and then stored while keeping the hermetically sealed condition.

The film thickness in the case of the bag is preferably 8 to 300 μm, more preferably 20 to 120 μm and the wall thickness in the case of the container is preferably 0.3 to 2 mm.

The particles in the hermetically sealed, irradiated condition are preferably stored at the temperature of 80° C. or lower, more preferably −50° C. to +50° C., and most preferably at ordinary room temperature. Storage over 100 days under these conditions can be achieved.

The method of the present invention will hereinafter be described more specifically by using representative Examples and Comparative Examples. It should however be borne in mind that these examples are intended to be exemplary of the invention and the present invention is therefore not limited to or by these examples.

EXAMPLE 1–7 AND COMPARATIVE EXAMPLE 1

For the control of the initial conditions, the following test was carried out with packing the fungus bodies together with adsorbent particles.

Sterilized water (14 ml) were added to four slants in which *Aspergillus niger* MCI 1528 had been cultured, and spores were scraped off. The suspension thus obtained was transferred into a centrifugal tube and subjected to centrifugal separation at 12,000 rpm for 10 minutes, followed by removal of the supernatant. The above operation was repeated three times to wash the spores. The spores were recovered, added to 10 ml of sterilized water, and dispersed to make a solution. The solution thus obtained was used as a culture solution.

In each of polyethylene bags, 100 ml of "DIAION HP20" (a product name; a product of Mitsubishi Chemical Corporation, specific surface area: 617 $m^2$/g, mean pore volume: 1.34 ml/g, average particle size: about 500 μm), a commercially available synthetic adsorbent of a styrene-divinylbenzene copolymer, were weighed in the swollen state with water. After 1 ml of the culturing solution obtained above was added to 100 ml of the adsorbent, the opening of the polyethylene bag was hermetically sealed by heat sealing, whereby the fungus bodies were uniformly dispersed and attached to the adsorbent.

Each of the hermetically sealed polyethylene bags was irradiated with γ rays at the irradiation dose rate and for irradiation time as shown below in Table 1 by an irradiation apparatus having cobalt 60 as a radiation source.

The pore volume after the irradiation was measured by "ASAP 2400" (a product name, a manufacture of MICROMERITICS CO., LTD.). In addition, the presence or absence of the surviving fungus bodies was studied by the fungus body incubation method.

As a result, it was confirmed that in each of Examples 1 to 7 where the synthetic adsorbent inoculated with spores was irradiated with γ rays; that no substantial difference was observed in the water content, specific surface area and pore volume between the adsorbent irradiated with γ rays and that not irradiated with γ rays and furthermore; and that the spores were killed by the γ ray irradiation. The results are shown in Table 1.

TABLE 1

|  | Comparative Example 1 | Example 1 | Example 2 | Example 3 | Example 4 | Example 5 | Example 6 | Example 7 |
| --- | --- | --- | --- | --- | --- | --- | --- | --- |
| Irradiation dose rate (kGy/h) | 0 | 5 | 5 | 10 | 10 | 10 | 10 | 10 |
| Irradiation time (h) | 0 | 2 | 4 | 0.5 | 1 | 2 | 3 | 4 |
| Irradiation dose (kGy) | 0 | 10 | 20 | 5 | 10 | 20 | 30 | 40 |
| Results of incubation test 7 days after | + | − | − | − | − | − | − | − |
| Water content (wt. %) | 57.9 | 57.8 | 57.8 | 57.8 | 57.8 | 57.8 | 57.8 | 57.8 |
| Pore properties |  |  |  |  |  |  |  |  |
| Pore volume (ml/g) | 1.34 | 1.38 | 1.36 | 1.40 | 1.42 | 1.32 | 1.35 | 1.30 |

TABLE 1-continued

| | Comparative Example 1 | Example 1 | Example 2 | Example 3 | Example 4 | Example 5 | Example 6 | Example 7 |
|---|---|---|---|---|---|---|---|---|
| Specific surface area (m²/g) | 617 | 601 | 620 | 613 | 606 | 619 | 610 | 610 |

Note:
−: The survival of A. niger was not recognized.
+: The survival of A. niger was recognized.

EXAMPLE 8

A 100 ml portion of "DIAION HP20SS" (a product name; a product of Mitsubishi Chemical Corporation, specific surface area: 540 m²/g, mean pore volume: 1.29 ml/g, average particle size: about 120 μm), a commercially available synthetic adsorbent of a styrene-divinylbenzene copolymer, were weighed in the swollen state with water and then hermetically sealed in a polyethylene bag. The polyethylene bag so obtained was irradiated with γ rays at 10 kGy by an irradiation apparatus having cobalt 60 as a radiation source. Before and after γ rays irradiation, the pore volume and specific surface area of the synthetic adsorbent were measured by "ASAP 2400" (a product name, a manufacture of MICROMERITICS CO., LTD.) and "Flowsorb 2300" (a product name, a product of MICROMERITICS CO., LTD.), respectively. As a result, it was confirmed that, in the test of the irradiation of the synthetic adsorbent with γ rays, no substantial difference was observed in the specific surface area and pore volume, as shown in Table 2, between the adsorbent before and after γ ray irradiation.

In a similar manner to Examples 1 to 7, the water content and the presence or absence of the surviving fungus bodies with the passage of time were also studied. The results are shown in Table 2.

TABLE 2

| | Example 8 |
|---|---|
| Irradiation dose rate (kGy/h) | 5 |
| Irradiation time (h) | 2 |
| Irradiation dose (kGy) | 10 |
| Results of incubation test 7 days after | — |
| Pore properties | |
| Pore volume (ml/g) | 1.32 |
| Specific surface area (m²/g) | 536 |

EXAMPLE 9

A 5 kg portion of "DIAION HP20SS" (a trade name; a product of Mitsubishi Chemical Corporation), a commercially available synthetic adsorbent of a styrene-divinylbenzene copolymer, were put into a polyethylene bag under atmospherically open condition, and the opening of the polyethylene bag was hermetically sealed by heat sealing. The polyethylene bag so obtained was irradiated with radioactive rays at 10 kGy by an irradiation apparatus having cobalt 60 as a radiation source. The bag was stored at room temperature for 24 months.

The bag was opened in a sterilized room, a 0.2 g portion of the adsorbent was put on Petri dish including Potato Dextrose agar. The plate was incubated at 27° C., for 10 days. Growth of fungus was not observed. From this experiment, it was confirmed that the spores were killed by the irradiation.

COMPARATIVE EXAMPLE 2

The experiment of Example 9 was repeated except that the irradiation of radioactive rays was not carried out, and the adsorbent on the Petri dish was observed. Growth of fungus, which was identified as Penicillium sp., was observed. From this experiment, it was confirmed that the spores were not killed by the irradiation.

As shown above, the adsorbent particles irradiated with radioactive rays in the hermetically sealed condition had a long-term antimicrobial effect and, moreover, were free from decrease in the adsorbing performance for a long period of time.

While the invention has been described in detail and with reference to specific embodiments thereof, it will be apparent to one skilled in the art that various changes and modifications can be made therein without departing from the spirit and scope thereof.

This application is based on Japanese patent application 7-309213, filed on Nov. 28, 1995, incorporated herein by reference.

What is claimed is:

1. A method for storing adsorbent particles of styrene-divinylbenzene copolymer, which comprises hermetically sealing the adsorbent particles, irradiating the adsorbent particles with radioactive rays in the hermetically sealed condition, and storing said adsorbent particles in the hermetically sealed condition.

2. A method for storing adsorbent particles according to claim 1, wherein said adsorbent particles are porous particles each having a specific surface area of from 10 m²/g to 1,500 m²/g, a pore volume of from 0.1 ml/g to 3 ml/g, and a particle size of from 5 μm to 1,000 μm.

3. A method for storing adsorbent particles according to claim 1, wherein the adsorbent particles are irradiated at an irradiation dose of from 5 kGy to 20 kGy.

4. A method for storing adsorbent particles according to claim 1, wherein the adsorbent particles are irradiated with γ rays.

5. A method for storing adsorbent particles according to claim 4, wherein the adsorbent particles are irradiated with γ rays with Cobalt 60 as a radiation source.

6. A method for storing adsorbent particles according to claim 1, wherein the adsorbent particles are hermetically sealed in a bag of a thermoplastic resin film.

7. Adsorbent particles of styrene-divinylbenzene copolymer which are in a hermetically sealed state and which have been irradiated with radioactive rays while in a hermetically sealed state.

* * * * *